(12) United States Patent
Augst

(10) Patent No.: US 11,062,598 B2
(45) Date of Patent: Jul. 13, 2021

(54) METHOD, MOBILE USER DEVICE, AND COMPUTER PROGRAM FOR PRODUCING VISUAL INFORMATION FOR AT LEAST ONE OCCUPANT OF A VEHICLE

(71) Applicant: Bayerische Motoren Werke Aktiengesellschaft, Munich (DE)

(72) Inventor: Alexander Augst, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/748,870

(22) Filed: Jan. 22, 2020

(65) Prior Publication Data

US 2020/0160703 A1 May 21, 2020

Related U.S. Application Data

(63) Continuation of application No. PCT/EP2018/071137, filed on Aug. 3, 2018.

(30) Foreign Application Priority Data

Sep. 4, 2017 (DE) ............... 10 2017 215 406.3

(51) Int. Cl.
*G08G 1/0962* (2006.01)
*G08G 1/01* (2006.01)
(Continued)

(52) U.S. Cl.
CPC ......... *G08G 1/0962* (2013.01); *G08G 1/0112* (2013.01); *G08G 1/09626* (2013.01);
(Continued)

(58) Field of Classification Search
CPC .......... G08G 1/00; G08G 1/01; G08G 1/0104; G08G 1/0108; G08G 1/012; G08G 1/09;
(Continued)

(56) References Cited

U.S. PATENT DOCUMENTS

2008/0071465 A1* 3/2008 Chapman ........... G01C 21/3691
701/117
2013/0261888 A1* 10/2013 Nagai ................. H04M 1/7253
701/36

(Continued)

FOREIGN PATENT DOCUMENTS

DE 10 2012 112 441 A1 6/2014
DE 10 2013 212 916 A1 1/2015
(Continued)

OTHER PUBLICATIONS

International Search Report (PCT/ISA/210) issued in PCT Application No. PCT/EP2018/071137 dated Dec. 12, 2018 with English translation (five (5) pages).
(Continued)

*Primary Examiner* — Van T Trieu
(74) *Attorney, Agent, or Firm* — Crowell & Moring LLP

(57) ABSTRACT

A method produces visual information, by way of a mobile user device, for at least one occupant of the vehicle in connection with at least partially automated driving, in which method visual information, in particular an image sequence, is displayed on a display of the mobile user device. The image sequence represents a traffic situation detected by the vehicle and/or a need for action of an occupant which is requested or recommended in this context.

19 Claims, 3 Drawing Sheets

(51) Int. Cl.
  *H04W 4/48* (2018.01)
  *B60K 35/00* (2006.01)
  *B60W 50/14* (2020.01)
  *B60W 50/16* (2020.01)
  *H04M 1/725* (2021.01)

(52) U.S. Cl.
  CPC ........ *B60K 35/00* (2013.01); *B60K 2370/175* (2019.05); *B60K 2370/566* (2019.05); *B60W 50/14* (2013.01); *B60W 50/16* (2013.01); *B60W 2050/143* (2013.01); *B60W 2050/146* (2013.01); *H04M 1/725* (2013.01); *H04W 4/48* (2018.02)

(58) Field of Classification Search
  CPC ...... G08G 1/0692; G08G 1/123; G01C 21/28; G01C 21/36; G01C 21/367; G01C 21/3691; H04W 4/48
  See application file for complete search history.

(56) References Cited

U.S. PATENT DOCUMENTS

| | | | |
|---|---|---|---|
| 2014/0306833 A1* | 10/2014 | Ricci | H04W 36/0005 340/901 |
| 2015/0015386 A1 | 1/2015 | Langenhan | |
| 2016/0121907 A1* | 5/2016 | Otake | B60W 10/18 701/23 |
| 2016/0214531 A1 | 7/2016 | Bachorski | |
| 2016/0236692 A1 | 8/2016 | Kleen et al. | |
| 2016/0301808 A1* | 10/2016 | Choi | H04M 1/72469 |
| 2017/0060397 A1 | 3/2017 | Junge et al. | |
| 2017/0072967 A1 | 3/2017 | Fendt et al. | |
| 2018/0120838 A1 | 5/2018 | Boos | |
| 2019/0126942 A1* | 5/2019 | Goto | B60Q 9/00 |

FOREIGN PATENT DOCUMENTS

| | | |
|---|---|---|
| DE | 10 2013 219 8 | 4/2015 |
| DE | 10 2014 210 147 A | 12/2015 |
| DE | 10 2015 201 456 A1 | 7/2016 |
| DE | 10 2015 205 580 A1 | 9/2016 |
| WO | WO 2013/113709 A1 | 8/2013 |
| WO | WO 2016/120363 A2 | 8/2016 |

OTHER PUBLICATIONS

German-language Written Opinion (PCT/ISA/237) issued in PCT Application No. PCT/EP2018/071137 dated Dec. 12, 2018 (six (6) pages).

German-language Search Report issued in counterpart German Application No. 102017215406.3 dated Jun. 19, 2018 with partial English translation (14 pages).

* cited by examiner

METHOD, MOBILE USER DEVICE, AND COMPUTER PROGRAM FOR PRODUCING VISUAL INFORMATION FOR AT LEAST ONE OCCUPANT OF A VEHICLE

CROSS REFERENCE TO RELATED APPLICATIONS

This application is a continuation of PCT International Application No. PCT/EP2018/071137, filed Aug. 3, 2018, which claims priority under 35 U.S.C. § 119 from German Patent Application No. 10 2017 215 406.3, filed Sep. 4, 2017, the entire disclosures of which are herein expressly incorporated by reference.

BACKGROUND AND SUMMARY OF THE INVENTION

The invention relates to a method, to a device and to a corresponding computer program for producing visual information for at least one occupant of a vehicle, in particular in the case of at least partially automated driving. In addition, the scope of the invention also includes a correspondingly configured mobile user device.

In the future, vehicles will be operated with ever higher levels of automation so that a driver (or in the future the vehicle occupant in the driver's seat) will not always have to concentrate on the vehicle or on the surroundings of the vehicle. However, it may certainly be necessary for the driver to concentrate again on the surroundings of the vehicle depending on the situation (also at very short notice). At the same time, the occupants of the vehicle which is driving in an automated fashion will wish to benefit from the fact that they are having to dedicate themselves less and less to driving tasks by pursuing further activities.

The object of the present invention is to provide a method and a device comprising a mobile user device, which method and device provide to improved usability of a mobile device in the vehicle in particular in the case of at least partially automated driving. In addition, the object of the invention is to output (expedient, desired or necessary) information to at least one occupant of the vehicle, in particular in the context of at least partially automated driving.

The object is achieved by means of the features of the independent patent claims. Advantageous refinements are characterized in the dependent claims.

The invention is distinguished by a method for producing visual information for an occupant of the vehicle in the context of at least partially automated driving with means of a mobile user device. The invention is distinguished by a device which is designed to carry out the method. The method comprises outputting visual information on a display device of the mobile user device, in particular an image sequence representing a traffic situation which is detected with means of the vehicle and/or a required action by a vehicle occupant, which is requested or recommended in this context.

The detected traffic situation may be a traffic situation which is evaluated or interpreted e.g. with means of a vehicle. Said visual information can comprise one or more graphic representations.

Visual information for an occupant of the vehicle can be produced here in accordance with the detection of a condition which is determined in advance. Said condition which is determined in advance is preferably in a direct or indirect relationship with the at least partially automated driving.

In particular, the production of said visual information for an occupant of the vehicle in the mobile user device can take place as a function of specific limiting value parameters being exceeded and/or undershot. For example, at least one limiting parameter characterizes a currently executed, partially automated driving and/or a boundary condition according to which the at least partially automated driving is carried out (currently or in the near future of several seconds). Alternatively or additionally, the at least one condition which is determined in advance can characterize that it is necessary, or will be necessary within several seconds, for the occupant to direct their attention to the surroundings of the vehicle and/or to operation of the vehicle, e.g. to a specific vehicle functionality, in particular to a driver intervention in the control of the vehicle.

Alternatively or additionally, the production of visual information for an occupant of the vehicle can take place as a function of a variable which represents the degree of automation of the travel of the vehicle, in particular a change in the at least one variable which represents the degree of automation of the travel of the vehicle. The at least one variable which represents the degree of automation of the travel of the vehicle can characterize here some of the driving tasks which are performed by the vehicle or by the active system for at least partially automated driving. For example, the production of visual information for an occupant of the vehicle takes place as a function of the reduction in a current variable which represents the degree of automation predicted for the near future (e.g. for a specific time interval and/or for a (specific) section of route lying ahead).

Said visual information, in particular at least a graphic representation, can preferably be determined and output at least partially in a three-dimensional fashion or apparently three-dimensional or spatial fashion. In this context, the objective technical advantage arises that understanding or interpretation of the determined traffic situation and/or of the required action by the vehicle occupant is significantly facilitated or speeded up.

In the method, an expediently selected excerpt of said traffic situation, in particular a specific arrangement of road users, is particularly preferably determined, in particular selected. For example, the information which is transferred to the mobile user device can characterize a selected excerpt of said traffic situation. Alternatively or additionally, the excerpt of the traffic situation can be determined (expediently selected) with means of the mobile user device.

For example, an excerpt of the traffic situation is selected (and subsequently represented with or without a further computational interpretation) which is detected as unusually (particularly) relevant in the current time interval and/or in a time interval in the near future. For example, an excerpt of said traffic situation to which the at least one necessary required action of the occupant relates or is to relate is selected.

The outputting of the visual information can also take the form of a significant increase in size, of emphasis, significant raising of a display priority or shifting into the foreground of visual information which has until now only been output with strictly limited parameters. For example, depending on said condition which is determined in advance, the visual information is output significantly enlarged, in particular on the predominant display area of the display unit of the mobile user device and/or output with more distinctive output parameters.

For example, in particular if the condition which is determined in advance does not apply or no longer applies, the said visual information is output with highly restricted parameters, i.e. in a smaller window and/or as an image-in-image display and/or in a form which is reduced in terms of content.

The said visual information can be displayed in the method with different shapes and/or from different perspectives. The shape and/or the illustrated perspective can be selected, in accordance with the time interval and/or section of roadway and/or particularly challenging locations, e.g. intersections, exits etc. to which said information refers, and/or in accordance with the number and speed of the object represented therein.

For example, for visual information in conjunction with existing challenging locations such as e.g. an intersection, priority situation, etc. and/or in the case of complex arrangements of the road users, a perspective can be selected as an increased perspective, for example: "aerial view" or oblique "aerial view".

The method can particularly preferably be carried out in the case of at least partially automated driving or in accordance with the at least partially automated driving mode of a vehicle. The partially automated driving or driving mode can also be considered to include driving, or a driving mode, which is assisted with a driver assistance system.

The mobile user device of an occupant of a vehicle is, in particular, a mobile user device which is carried along in the vehicle (in the driving mode) or mounted in the vehicle. In particular, the mobile user device of an occupant is the mobile user device which is used by a (specific) occupant.

A display of the traffic situation which is interpreted by a machine, in particular simplified or reduced or concentrated to the essential, is preferably displayed on the mobile user device. For example, the display of the traffic situation comprises emphasizing the essential features of the traffic situation or objects which are essential (at the current point in time) and/or required actions which are associated with the specific features of the traffic situation or with the objects. Such a display can help to output informative vehicle occupant information, which can be taken in rapidly by the occupant, about the registered traffic situation and/or the identified required action with limited means of an output unit of the mobile user device.

For example, the vehicle occupant information here can comprise or represent visual information:

at least one excerpt of a representation of the surroundings of the vehicle which is captured with a camera of the vehicle (e.g. a camera carried along in the vehicle);

a representation which represents information, for example pedestrians, other vehicles etc., registered with a thermal imaging camera of the vehicle;

graphic information which is input or augmented at least partially transparently into a representation and which characterizes a respective traffic situation or at least one feature of the traffic situation, in particular a deviation from a previously determined standard, e.g. the exceeding of specific limiting values of the parameters characterizing the traffic situation. For example, excessively small distances between the vehicles (to the side, to the rear, to the front) can be displayed by a further road user.

A required action, e.g. as an action instruction by means of an image sequence, in particular an image sequence which is coherent in a causal fashion (in an animated form) can particularly preferably be configured such that it is, in particular, included in the representation of the surroundings.

The visual information, in particular the vehicle occupant information, can particularly preferably comprise or characterize a graphic representation of a specific operator control element of the vehicle and/or a visual representation of a specific action which is to be carried out by the vehicle occupant by means of an operator control element of the vehicle in order to carry out said operator control action. For example, an image sequence can be displayed as an animation, comprising a symbolically displayed driver's hand and/or driver's foot with which a steering wheel (which is also displayed symbolically), an accelerator pedal, a brake pedal and/or a further operator control element of the vehicle, the required action is to be carried out. For example, the vehicle occupant information can also characterize how, in which specific way, in which direction, in which sequence, with what intensity a steering wheel, an accelerator pedal, a brake pedal and/or a further operator control element is to be operated.

According to one optional refinement, the visual information, in particular an image sequence representing the traffic situation and/or a required action, relating to the traffic situation, of a vehicle occupant, in particular of the driver or of the vehicle occupant in the driver's seat, represents a reality which is predicted in the near future.

The reality predicted in the near future can be, for example, a reality which is predicted in the near future, e.g. 1-15 seconds. Such a reality may be determined, for example, on the basis of a simulation. This simulation may also be determined as a probability-based prediction. For example at least one or two probable (most probable) developments of the traffic situation can be determined and displayed on the mobile user device. For example, the visual information can comprise at least one (expediently determined) image sequence, in particular an animation, which is determined by means of a simulation and/or computer-generated.

The reality for the near future, which is predicted in the near future, can be determined, for example, on the basis of known physical laws, probability calculation, so-called machine learning and/or artificial intelligence. In particular, such a predicted reality is determined with respect to a time horizon of several seconds and/or for a specific roadway section, e.g. an intersection, exit, crossing lying ahead.

In this context, the visual information can represent, for example, an arrangement and/or interaction (expected for the near future) of objects, e.g. of the road user with respect to one another and/or of the vehicle and of one or more objects from its surroundings. For example, said predicted reality can comprise one or more symbolic representations for one or more road users, objects or sections of the surroundings which have, in particular, already been detected in the current time interval. In this context, the predicted reality can also comprise e.g. a combination of elements which are represented at least partially photo-realistically and at least partially symbolically.

Alternatively or additionally, the visual information can represent desired, aimed-at or improved arrangements and/or interactions and/or undesired object arrangements and/or interactions which are to be avoided, e.g. of the road user with respect to one another and/or of the vehicle and of one or more objects from its surroundings.

In this context, the vehicle occupant information can characterize a parameter of a situation which can arise e.g. in the next few seconds, and can characterize what and/or how the respective vehicle occupant can or is to do in this context, e.g. only in the case in which the situation will occur approximately as predicted. In other words, the vehicle occupant information can comprise for example the information regarding "what", "when", "how" and/or "what to do".

In this context, valuable time can be saved by virtue of this refinement in that a necessary required action and/or the manner in which the action is to be carried out is clarified in advance to the respective vehicle occupant, in particular the driver, with other means. For example, a variant of a real situation (traffic situation, driving situation), e.g. of the course of a maneuver, which e.g. has an above-average probability or exceeds a limiting value can be clarified. The driver can therefore advantageously be prepared for action or reaction when his perception and/or attention is transferred to the real surroundings if the traffic situation already partially or largely develops in the predicted way.

The reality which is predicted in the near future relates particularly preferably to a time interval in which the attention and/or perception of the driver is transferred to the respective part of the real surroundings (corresponding to the part of the predicted reality which is represented in the visual information, e.g. in the graphic representation), e.g. to specific road users or an arrangement of road users.

For example, a determined estimated assigned time value, which is expected to be required for the vehicle occupant, is taken into account, said time value being necessary so that the vehicle occupant transfers his perception, e.g. including the necessary accommodation time for visual perception and/or attention, to the real, then valid surroundings of the vehicle and/or to the instrument panel of the vehicle. Alternatively or additionally, a further reaction time can be taken into account.

According to a further optional refinement, an active display content of the mobile user device is reduced, paused or prepared and/or vehicle occupant information which is different from the active display content, and which at least partially represents the respective traffic situation and/or the required action by the occupant of the vehicle which is connected to the traffic situation, is output. The vehicle occupant information can comprise here said visual information and/or a further display.

The change, in particular reduction and/or pausing, of the content which has previously been output with means of the mobile user device and/or the outputting of the vehicle occupant information with means of the mobile user device can preferably be linked, in particular, to at least one condition which can be determined with means of the vehicle, e.g. with the sensor system of the vehicle. Such a condition can characterize e.g. that the registered traffic situation corresponds to previously determined criteria, in particular if a (safety) critical traffic situation and/or (safety) critical required action is detected.

The method can comprise preparation of the data relating to the at least one registered traffic situation and/or relating to at least one required action. The preparation can be carried out at least partially with means of the vehicle and/or at least partially with means of the mobile user device. In this context, for example data of the sensor system of the vehicle can be prepared, in particular analyzed and interpreted. Preparation of the data here, in particular, comprises filtering, e.g. extraction of relevant conditions and/or emphasizing of critical objects in the surroundings of the vehicle. In addition, the preparing of the data can comprise, determining a prediction for the near future, for example an extrapolation of at least part of the traffic situation and/or a required action for the next few seconds.

The preparation of the data preferably comprises determining information which is to be transferred to the mobile user device and/or vehicle occupant information which is to be output subsequently at the mobile user device and which relates to the traffic situation and/or the required action which applies or is optimized at the point in time in the near future, e.g. approximately 1, 2, 3, 5 or 10 seconds after the actuation of the output unit of the mobile user device.

In particular, the information which is to be transferred to the at least one mobile user device and/or the vehicle occupant information which is then output can be related to the traffic situation and/or the required action which will apply (e.g. according to a prediction or extrapolation of at least part of the traffic situation for the near future). Therefore, after the respective vehicle occupant's eyes have adjusted, e.g. for example to dark surroundings of the vehicle after viewing a bright screen of the mobile user device, the vehicle occupant can be provided with vehicle occupant information which will apply, for example at the point in time at which the adjustment is sufficiently concluded (for example with a certain probability). Therefore, the driver of the vehicle or the vehicle occupant on the driver's seat can more or less uninterruptedly perceive the traffic situation which then applies and can quickly "find his bearings" and react or act.

For example, when there are at least two occupants in the vehicle, a vehicle occupant and/or a specific mobile user device can be determined which can transfer their perception and/or attention (at least with a high probability) better or quicker to the real surroundings. Then, at least one specific mobile user device, to which at least one item of information which is to be transferred is transferred, and/or the vehicle occupant information which is then output at the mobile user device is selected.

A previous display, which, for example, has been observed or operated by the vehicle occupant can preferably be reduced, in particular minimized, with respect to its display area, display sharpness and virtually experienced display proximity. The reduction can in this context also comprise complete switching off, concealment or shifting into the background. The at least one output unit of the mobile user device is preferably actuated in such a way that a reduction and/or pausing of the previously output content takes place. For example, the previously output contents can be reduced to the tendentially more important scopes and/or a symbolic display of at least part of the contents, e.g. of the display contents, audio contents and haptically and/or tactically perceptible contents, can be carried out. For example, a virtual reality which is produced with the mobile user device, e.g. a video game, can be paused. In this context it is possible to ensure that the perception and/or attention of the vehicle occupant are transferred very much more quickly to his real surroundings, in particular to the traffic situation or to a specific action, e.g. operative control action.

According to a further optional refinement, the method additionally comprises:
registering a traffic situation and/or determining a specific required action by at least one occupant of a vehicle in the driving mode,
transferring information which is dependent on the registered traffic situation and/or the at least one specific required action by the occupant of the vehicle, to the mobile user device of at least one occupant of the vehicle, and subsequently,
actuating the mobile user device in accordance with the transferred information, wherein visual information, in particular an image sequence, which represents the traffic situation and/or the required action at least symbolically is output.

The at least one information item which is dependent on relating to the registered traffic situation and/or of the at least one specific required action of the occupant of the vehicle can occur here on the basis of the evaluation of the traffic situation and/or of further parameters which relate to the present driving context, e.g. also by means of artificial intelligence. The visual information in the method can also comprise visual information determined, e.g. also selected or assigned, at least partially with means of the mobile user device, e.g. can be one or more graphic representations. This is/these are preferably output, e.g. made visible or enlarged, to the reception of said information transferred to the mobile user device.

The information which is dependent on the registered traffic situation and/or on the at least one specific required action of the occupant of the vehicle can be determined in the method, in particular with means of the vehicle or of a vehicle unit, in accordance with one or more qualitative and/or quantitative parameters of the registered, in particular interpreted, traffic situation and/or of the required action.

For example, the output unit of the at least one mobile user device which is operated in the vehicle can be actuated here in such a way that at least one content, e.g. display, image sequence, e.g. a film, audio content, which was to be previously output is changed and/or paused. Therefore, an impulse (virtually instinctive for modern humans) to follow the virtual contents with a high level of attention, can be at least partially attenuated.

The content which was to be previously output can be a further, as it were "intrinsic" content which is, in particular, independent of the vehicle or of the journey, which is generated or played back with means of the mobile user device, said content being e.g. a computer game or an operator interface of a social network. The content which was to be previously output is, in particular, independent per se of the vehicle or of the journey in the vehicle. The outputting of the mobile user device can occur more or less directly or indirectly in the method, e.g. by influencing a running application or the operating system of the mobile user device. In particular, the actuation of the output unit can take place with a high (way above average) priority in comparison to at least one further content which is to be output.

Alternatively or additionally, the output unit of the at least one user device which is operated in the vehicle is actuated in such a way that vehicle occupant information (which can be interpreted, is determined, again by human perception) is output by means of the output unit. The vehicle occupant information can have a predetermined relationship here, in terms of its contents, output parameters, in particular an output time or output time interval etc., with the registered traffic information and/or with the determined required action. For example, at least one content, output parameter, in particular an output time or output time interval, is determined in accordance with one or more parameters of the registered traffic situation and/or the required action. The displaying of vehicle occupant information with a relatively high priority and/or perceptibility is preferably brought about as one or more contents which have previously been output at the mobile user device.

Said vehicle occupant information can preferably at least temporarily and/or at least partially replace at least one content which was to be previously output at the mobile user device. For example, the ratio of the sizes, display areas, intensity level of a content which was to be previously output (and is independent of the vehicle or the driving) and vehicle occupant information (which is dependent on the traffic situation and/or a required action with respect to the operator control of the vehicle) is changed, in particular adapted, by the direct or indirect actuation of the output unit of the mobile user device.

In particular, the method is carried out in such a way that a vehicle occupant, for example the driver of the vehicle or a vehicle occupant on the driver's seat, is provided with vehicle occupant information relating to the traffic situation and/or the required action, in particular relating to an action to be carried out by the vehicle occupant, by means of said mobile user device which is, in particular, operated actively by said vehicle occupant. This can still preferably take place in the method while the perception and/or attention of the respective vehicle occupant is essentially concentrated on the mobile user device or specific further contents at the mobile user apparatus, e.g. while his perception channels, e.g. eyes, targeted hearing, senses, etc. are concentrated on the mobile user device. This provides inter alia the advantage of very rapid transfer, conscious perceptibility, ability to evaluate the vehicle occupant information or a corresponding suitable reaction by the respective vehicle occupant. The respective vehicle occupant can then react or act quickly and suitably by virtue of the corresponding change in the contents, to be output at the mobile user device, at the mobile user device which is used by him and/or using the vehicle occupant information which is output at the mobile user device, subsequently in the real world, e.g. with respect to the current driving context of the journey, the real surroundings of the vehicle etc.

The transfer of said information relating to the registered traffic situation and/or the at least one specific required action by the occupant of the vehicle to the mobile user device of the occupant of the vehicle can take place here in the form of a predetermined code. In this context, the necessary data rate can be reduced for example in comparison with a transfer of all the vehicle occupant information which is to be output at the mobile user device, or the transfer rate can be increased.

The transfer of said information particularly preferably takes place by means of a direct wire-bound or wireless exchange of data. The transfer of said information preferably takes place by means of WLAN or preferably by means of a so-called WPAN (=Wireless Personal Area Network), e.g. a short-range transmission method, e.g. Bluetooth or the like. In this context, very high real-time capability of the method can be achieved. This provides numerous advantages, for example in comparison with an indirect exchange of data, e.g. via a plurality of intermediate computing units. The transferred information can comprise, for example, control signals relating to direct or indirect actuation of the output unit of the mobile user device.

The information which is transferred to the mobile user device particularly preferably represents graphic parameters and/or an image sequence and/or vector parameters for outputting said visual information. For example, the transferred information represents information relating to the positioning of individual elements of the visual information on the at least one output unit of the mobile user device. For example, in a first step, individual elements of the visual information, representing further road users, further objects, travel trajectories, the actual vehicle, can be determined, e.g. as symbols or graphics (e.g. in response to the transfer of a first part of the transferred information). This information can be determined as it were in advance (that is to say: "ahead"). Said elements can be calculated in advance or prepared e.g. as corresponding data sections (prepared at least partially for display) relating to said elements in the memory of the mobile user device. In a second step (e.g. dependent on said condition which is determined in advance), the relative positions or an arrangement of the elements of the representation can be determined (e.g. in response to the transfer of a second part of the transferred information). In this context, said visual information can, where necessary, be displayed in a very short time or, e.g. updated to a new or alternative prediction. In this context, the visual information can where necessary, and depending on requirements, be determined finally in a very short time ("assembled" from the prefabricated element) and output. In this context, in particular a predicted reality (which can be changed as quickly as possible or as an alternative reality) can be output very quickly.

In addition, in the method it is also possible to transfer further (second) information (information of a second type) from the at least one mobile user device to the vehicle or to the vehicle unit. This further information can be (inter alia) characteristic for which actuation of the output unit of the mobile user device has been carried out successfully, e.g. with respect to the time when a previous content was changed and/or vehicle occupant information was output at the mobile user device. Further information can also be characteristic of the reaction of the respective vehicle occupant to the actuation of said at least one output unit of the mobile user device.

For example, at least one function of the vehicle can be actuated in response to the reception of the wide information (in accordance with reception of the further information). For example, the at least one vehicle function, in particular a function relating to the at least partially automated driving, actuated in accordance with whether and how the at least one vehicle occupant has reacted to the actuation of the output unit of his mobile user device. For example, further information can be transferred from the at least one mobile user device to the vehicle or to the vehicle unit, which information is characteristic of the fact that the occupant has interrupted the operation of the user device and/or has turned away his perception or attention from the mobile user device or from a specific content of the mobile user device. Such further information can be determined, for example, with means of the mobile user device, e.g. by means of the camera of the mobile user device. The transferred further information can be made available in the on-board power system of the vehicle, for example to control at least one vehicle function. In response to the transfer of the further information from the at least one mobile user device to the vehicle or to the vehicle unit it is possible to change e.g. an at least partially automated vehicle control process, in particular the vehicle control action, e.g. a maneuver, which is currently being carried out or which is being planned for the near future, and a decision can be made with respect to at least one (current) instance of influencing the control of the vehicle, or a safety measure, for example a so-called precrash measure, can be brought about in the vehicle.

The output unit is here, in particular, a display, e.g. a screen display or an actuator and/or an audio output and/or a unit, such as a headset or a hearing device, which is connected to a person's body.

Actuation particularly preferably takes place in such a way that the actuation of the output unit represents specific (concrete) information, in particular a concrete feature relating to the traffic situation and/or relating to the specific (concrete) required action by the driver.

The method can preferably be capable of being executed in one or more mobile user devices which are carried along in the passenger compartment of the vehicle. The method is particularly preferably carried out in accordance with the detection of at least one mobile user device and/or in accordance with a detected (active) use of the at least one mobile user device in the vehicle and/or in accordance with the driving mode of the vehicle. The method can be carried out in accordance with the detection of a use, in particular a use which exceeds a certain extent, of a mobile user device in the vehicle and/or with the detection of the driving mode of the vehicle, in particular in accordance with a parameter, which exceeds a specific limiting value, of the driving mode of the vehicle.

Within the scope of the present document, the current traffic situation or a traffic situation which is imminent in the near future of several seconds is to be understood as the traffic situation. In particular, a traffic situation in the immediate surroundings of the vehicle is to be understood as the traffic situation. In other words, the traffic situation is meant to be a traffic situation which is effective for the vehicle at the given time interval or in the near future of several seconds (virtually immediately). In particular, the traffic situation is a traffic situation which is registered with sensor means (camera, radar, lidar, ultrasonic system). Alternatively or additionally, the traffic situation can be considered to be an arrangement or arrangement pattern and/or movement parameter of further objects, e.g. road user in the immediate surroundings of the vehicle, e.g. in relation to the vehicle. In the method, the traffic situation and/or the required action can be registered or evaluated in conjunction with the respective driving context, nature of the road, within a locality, outside a locality, road arrangement, arrangement of road signs, behavior of at least one further road user.

The evaluation of the traffic situation is preferably carried out at least partially with means of the vehicle. In this context, the (suitably designed and/or configured) sensor system of the vehicle and, in particular, means of at least one driver assistance system, of a safety system or of a system for carrying out the at least partially automated driving can be used. Alternatively or additionally, the evaluation of the traffic situation can be carried out at least partially with means of the mobile user device.

The method therefore ensures that the driver or the vehicle occupant, who is supposed to do something in response to the driving and whose attention is paid predominantly to the virtual reality, is still prepared in the virtual reality for the real situation (which has occurred or will occur or is predicted).

In the method, expedient vehicle occupant information, in particular relating to an expediently selected time, in particular in accordance with a predetermined condition, can preferably be output to at least one vehicle occupant, within the virtual reality which is perceived by him and which can be transferred with a (predetermined) reference to the traffic situation and/or a required action, in particular a required action on the part of the driver or required action relating to the determined traffic situation.

In a highly simplified example, the vehicle occupant is provided with selected vehicle occupant information relating to the current or immediately imminent traffic situation or a content (required action which is tailored to this traffic situation) even during his perception, concentration, e.g. his viewing of a significant portion of content which is still output on the mobile user device or the content which is output on the mobile user device, e.g. in the virtual reality.

Said required action may also be e.g. a necessary or recommended operator control action for performing operator control of the vehicle on the part of the vehicle occupant, in particular of the driver or of the vehicle occupant in the driver's seat. The required action or the vehicle occupant information which is output in response to the registration of the required action, relates particularly preferably to a specific driving task, for example influencing of the lateral guidance, longitudinal guidance, execution of a maneuver of the vehicle. The vehicle occupant information can therefore be specific information which characterizes the traffic situation and/or the required action and which is directed, in particular, to the specific vehicle occupant. In addition, the vehicle occupant information can characterize a possible or imminent consequence of the traffic situation and/or of the execution of an action or failure to execute an action, e.g. a specific operator control action relating to the vehicle or a driver's task.

In addition, the vehicle occupant information which is output at the mobile user device in accordance with the transferred information can relate to the actions, in particular driver's tasks or driving actions which are explicitly not recommended or are to be avoided in the current time interval or with respect to the registered traffic situation and/or with respect to the registered required action. For example, if it is determined that the vehicle occupant in the driver's seat is actively using a mobile user device and during this time a specific driving action has been planned or started by the vehicle which is driving in an at least partially automated fashion, in particular highly automated fashion, such actuation of the output unit can take place that a counter-productive (possibly instinctive or shock) reaction of the vehicle occupant, e.g. braking, is avoided. For example if a change is brought about, planned in an at least partially automated fashion, in the at least control of the vehicle, for example an overtaking maneuver, feeding in maneuver, avoidance maneuver (e.g. owing to a change of traffic situation), specific vehicle occupant information can be output at the mobile user device of the vehicle occupant. The vehicle occupant information can characterize here that the vehicle occupant should refrain from carrying out specific actions. In this context, the vehicle occupant information can also characterize the specific reason and/or a consequence for to the actions.

Alternatively or additionally, said information which is to be transferred to the mobile user device can be determined in accordance with a technical state of the vehicle. For example, the information which is to be transferred can be determined and transferred in accordance with a technical state of the vehicle which undershoots a specific limiting value, in particular a technical state of one or more vehicle systems which require action by at least one vehicle occupant immediately or soon. Then, the at least one output unit of the mobile user device can be correspondingly actuated. For example, said information which is to be transferred to the mobile user device can be determined in accordance with more or less abrupt or unexpected worsening of the technical state of the vehicle. For example, vehicle occupant information which characterizes a specific (applicable) technical problem of the vehicle and/or a specific required action, if appropriate relating to or within the current journey, in conjunction with the technical state of the vehicle can be output at the mobile user device.

The method therefore also avoids the need for the relatively long process of getting one's bearings and orienting oneself in the real situation after the perception and/or attention, e.g. the gaze of the vehicle occupant, is averted from the mobile user device, and/or the typically necessary eye adjustment process (in response to real) vehicle surroundings and/or vehicle displays.

Vehicle occupant information can be output to the vehicle occupant, in particular to the driver of the vehicle, which information serves him already before, during or shortly after the transfer of his perception and/or attention from the mobile user device to the real surroundings of the vehicle.

Since the said transfer of the perception and/or attention can take up to five seconds depending on numerous criteria, e.g. lighting differences (between the passenger compartment of the vehicle, surroundings of the vehicle, display of the mobile user device), complexity of the driving context, disruptive factors, a considerable advantage is obtained in that said, in particular specific, vehicle occupant information is already available during this time and/or is always known to the vehicle occupant.

For example, vehicle occupant information can be output to the vehicle occupant, which information provides the vehicle occupant with at least one specific reference point or a tendency for a decision, reaction, driver's action even before his perception and/or attention is sufficiently transferred to the surroundings of the vehicle. In this context, said time of several seconds can expediently be used and/or the driver can be prevented from being surprised, for example by a traffic situation which is not expected by him or by an action decision which is appropriate.

The information which is transferred to the mobile user device (from the vehicle or from a computing unit operated in the vehicle) can be determined in the method in such a way that said information has a predetermined relationship to the traffic situation and/or the required action. The transferred information can be determined here in accordance with the detected, e.g. selected, parameters which exceed e.g. one or more specific threshold values of the traffic situation and/or a required action. For example, in accordance with one or more predetermined conditions it is possible to decide that information relating to or in accordance with the traffic situation and/or the required action is transferred. A content, a parameter of the information to be transferred can also be determined in accordance with one or more parameters of the traffic situation and/or of a required action.

The following particularly preferably take place in accordance with the transferred information relating to the detected traffic situation and/or to the required action by the occupant of the vehicle:

a change in a currently output content, e.g. a current display of the mobile user device, e.g. minimization of a distracting display and/or production of a further display on the mobile user device relating to the detected traffic situation or to the required action of the occupant of the vehicle, and/or a change in an audio output of the mobile user device, e.g. a reduction in the volume or pausing of an auditory communication and/or outputting of a sound in connection with the detected traffic situation or with the requested action by the occupant of the vehicle with the mobile user device, and/or actuation of an actuator of the mobile user device, in particular of an unbalance actuator, vibration actuator, acceleration actuator in connection with the detected traffic situation or with the required action by the occupant of the vehicle with the mobile user device.

In a simplified case, the information to be transferred to the at least one mobile user device operated in the vehicle and/or vehicle occupant information which is output in response thereto can comprise an identifier relating to a qualitative or quantitative parameter of the traffic situation and/or the required action (e.g. required action relating to the traffic situation). For example, information to be transferred to the at least one mobile user device operated in the vehicle and/or vehicle occupant information which is output in response thereto can comprise a parameter relating to the type and/or the criticality of the registered traffic situation and/or relating to the type and/or the urgency of at least one (specific) required action.

For example, the vehicle occupant information which is then output to the at least one mobile user device comprises components, e.g. symbols, selected sounds, specific haptic patterns, etc. which can be quickly interpreted (by means of human perception).

According to a further optional refinement, the output on the display device is (also) representative of:
a request for the vehicle occupant, in particular the vehicle occupant on the driver's seat or the driver, to direct their attention to the surroundings of the vehicle,
a request for the vehicle occupant, in particular for the vehicle occupant on the driver's seat or the driver, to direct their attention to information about the vehicle, in particular to a display of the vehicle, in particular relating to control of the vehicle,
a request to grip the steering wheel, in particular as a so-called "hands-on request",
a request for the vehicle occupant, in particular the driver, to briefly depress or operate a pedal of the vehicle or to confirm readiness to operate at least one pedal,
a request to change the vehicle speed,
a request to maintain an, in particular lateral, distance,
a request for the vehicle occupant, in particular the vehicle occupant on the driver's seat or the driver, to participate in a specific maneuver,
a request for the vehicle occupant, in particular the vehicle occupant on the driver's seat or the driver, to make a decision with respect to a specific maneuver,
a request for at least part of the control of the vehicle to be assumed by the vehicle occupant, in particular the vehicle occupant in the driver's seat or the driver,
a request to a front seat passenger to wake up or to stir the vehicle occupant in the driver's seat, or to communicate information to said vehicle occupant.

In particular, in this context corresponding vehicle occupant information is output with the output unit of the mobile user device. This information may be dependent e.g. on a parameter of the traffic situation and/or of the required action. For example, the vehicle occupant information can characterize a feature of the request for the vehicle occupant, in particular the vehicle occupant in the driver's seat or the driver to direct their attention to a (specific) object or spatial area in the vehicle or outside the vehicle, or a feature of the action etc. which is to be carried out by the vehicle occupant, in particular by the vehicle occupant in the driver's seat or by the driver.

According to a further optional refinement, the outputting on the display device takes place in accordance with one or more predetermined criteria relating to the determined traffic situation and/or the determination of a specific required action by at least one occupant, in particular a specific occupant, of a vehicle which is driving in an at least partially automated fashion.

In this context, a criterion which is determined in advance can be considered to be, for example:
an estimation of the significance and/or the urgency of information relating to a detected traffic situation and/or a required action by the driver,
a detection of a traffic situation as a traffic situation of a specific type, e.g. a collision probability,
a detection of a specific required action relating to: longitudinal guidance of the vehicle and/or lateral guidance of the vehicle,
exceeding of predetermined threshold values. Threshold values can also be selected in accordance with the driving context (urban driving, country roads, high street road, parking, driving in dense traffic, night driving, etc.).

In a simplified case, on the identification of the at least one predetermined criterion a simplified identifier relating to the driving situation which is registered, evaluated or predicted for the near future and/or possible or probable consequences of the traffic situation or of an incomplete action requirement by the vehicle occupant, in particular by the driver can be represented with the output unit of the mobile user device. In this context, the content, time of actuation of the at least one output unit of the mobile user device can also be selected in accordance with the at least one predetermined criterion, e.g. with one or more qualitative and/or quantitative parameters of the predetermined criterion.

In other words, in particular only prioritized information which is selected (according to predetermined criteria) can be transferred and/or actuation operations of the output unit of the mobile user device which are prioritized (according to predetermined criteria) can take place.

The actuation of the at least one output unit of the mobile user device is preferably selected in accordance with one or more predetermined criteria or qualitative or quantitative parameters of the predetermined criteria in such a way that a respectively expedient degree of perception and/or attention by the vehicle occupant to the information to be transmitted is taken up and/or directed or called to the surroundings of the vehicle in particular at an expediently selected point in time. In this context, e.g. a statistically applicable degree can generally be taken into account for humans in general, for a specific person of the vehicle occupant or for a specific class of persons to which the vehicle occupant belongs, which will take into account the properties of his action or reaction, e.g. a measure for his reaction capability.

In this context, the vehicle occupant, in particular the driver can be made to give up his activity, or made to give up his activity to a significant degree, only if the situation, in particular the overall situation requires it. For example, in the method a portion of the perception and/or attention of the vehicle occupant can be directed to a specific traffic situation and/or required action by the actuation of the output unit of the mobile user device, e.g. can be varied depending on predetermined criteria or further factors. In this context, in the case of required actions which are not very urgent, e.g. required decisions, firstly a specific part of the perception, e.g. only a specific perception channel of the vehicle occupant or part of his attention can be directed to the surroundings of the vehicle or to a driver's task.

If there are a plurality of occupants in the vehicle, one mobile user device per occupant is also typically arranged in the vehicle. Therefore it is advantageous to differentiate these mobile user devices. Therefore, according to a further advantageous refinement, one mobile user device in the passenger compartment of the vehicle is detected as that of the vehicle occupant in the driver's seat, and the outputting on the display device takes place on the detected mobile user device of the occupant in the driver's seat, preferably associated with at least one current driver, e.g. with the mobile user device of the occupant in the driver's seat. According to a further advantageous refinement, at least one mobile user device is detected as a mobile user device of a further, in particular of a specific, vehicle occupant or of a vehicle occupant in a further seat, and the outputting takes place on the display device on the detected mobile user device of the occupant in the further seat of the vehicle.

This refinement can be combined, in particular, with the previous refinement so that the transferred information is distributed as optimum as possible among the mobile user devices in the vehicle.

Since the information is then transferred in a targeted fashion, information can preferably be information which is adapted e.g. to a specific vehicle occupant or an occupant with a specific role. The information to be transferred can e.g. also be varied in accordance with the age, prior knowledge, driving license, a predefined permission to carry out the specific operator control actions, in particular specific driving tasks of the vehicle occupant.

Furthermore in this way the actuation of the output unit and/or at the mobile user device of the further vehicle occupant can optionally occur only when the actuation of the output unit of the vehicle occupant in the driver's seat was not possible and/or the attention of the vehicle occupant in the driver's seat was directed beyond the traffic situation and/or his mobile user device and/or was not confirmed by the occupant in the driver's seat.

In this context, the two types of information which have been output at the mobile user device of the occupant in the driver's seat and/or that of a further vehicle occupant may be different. For example, these types of information may differ in terms of the predetermined threshold and/or in terms of the role of the vehicle occupants.

The method can also be applied to a plurality of drivers or vehicle occupants who are authorized to drive, in a vehicle which is driving in particular at least in a partially automated fashion. According to the invention, a driver, a second driver who has approximately equal authorization and/or a co-driver can be defined with less or subordinate authorization. Such a role, for example of the first driver, of a second driver, of a co-driver, can be selected in the invention in accordance with the driver's seat in which the at least one vehicle occupant is seated. Such a role can also be divided between at least two vehicle occupants of the vehicle e.g. depending on the traffic situation and/or the required action.

One application case here is that in the case of an (urgent) required action which is detected by the vehicle, a co-driver is also informed if, for example, the driver has fallen asleep during highly automated driving.

The information which is transferred to the further vehicle occupant, e.g. to the co-driver, can be in this context, for example, a request to wake up the driver and/or a request to give the driver an instruction to be attentive if there is no pressing required action and/or can be a request to assume at least one operator control action of the vehicle in particular to carry out one or more specific operator control actions in the vehicle e.g. characterized within the information. For example, the actuation of the output unit of the mobile user device of a co-driver occurs in accordance with the reaction which has actually taken place to the actuation of the output unit of the mobile user device of the driver or in accordance with the further information of the mobile user device of the driver.

In particular, in this context a specific vehicle occupant can be detected as a specific person, e.g. the holder of the specific mobile user device, or as a vehicle occupant in a specific seat, e.g. in the co-driver's seat of the vehicle. The respective information can then be produced in a suitable way and/or addressed in a suitable way. In this context, the information for a further (second) vehicle occupant may be a second type of information which differs, for example, from the (first) type of information for the (first) driver and/or is output at the second mobile user device with a timing offset with respect to the first type of information.

In one preferred refinement, the method can comprise the following steps:

a mobile user device in the passenger compartment of the vehicle is detected as that of the vehicle occupant in the driver's seat, and at least one mobile user device is detected as a mobile user device of a further specific vehicle occupant or of a vehicle occupant in another seat the outputting takes place on the display device of the detected mobile user device of the vehicle occupant in the driver's seat; and/or the outputting takes place on the display device of the detected mobile user device of the vehicle occupant in the other seat of the vehicle.

In this context, both types of information may preferably be different. For example, they may differ in terms of the predetermined threshold and/or in terms of the role of the vehicle occupants. For example, the at least one second type of information can be output to a second mobile user device of a further (second) vehicle occupant, which second type of information is dependent on the reaction of the first occupant to the first type of information. For example, the second type of information is output for a further (second) vehicle occupant, if, in response to the transfer of the first type of information to the first vehicle occupant (e.g. the driver or the "first driver") has not brought about any reaction or any expected reaction or any sufficient reaction.

According to a further advantageous refinement, different threshold values relating to the significance of the traffic situation and/or significance and urgency of the required action by the vehicle occupant are differentiated, and different actuation processes of one or more output units of the mobile user device are subsequently carried out.

Different changes in the display of the mobile user device and/or different sounds, e.g. different sounds or sounds with differing loudness and/or different activation operations of a haptic actuator, e.g. vibrations or some other stimulus of the mobile user device are preferably brought about for different determined threshold values.

For example, if a specific, e.g. undesired, traffic situation develops slowly, in the case of information which exceeds a first threshold value (e.g. is not urgent), a non-urgent information display can be output e.g. displayed, on the mobile user device, e.g. also as an image-in-image display together with or within a further (previous) content, e.g. together with or within a further application on the mobile user device. However, if the traffic situation requires an urgent, in particular immediate reaction/action of the vehicle occupant, in the case of information which exceeds a second threshold value (e.g. urgent and important information), a previous content, e.g. the previous display, can for example be minimized, grayed out, concealed or reduced to symbols in accordance with the determined required action. In this context, the at least one output unit of the mobile user device can be actuated. The output unit can be actuated in such a way that the information to be transferred uses at least partially the resources which have been taken up by the previous content. For example, the portion of the display area and/or audio frequency bands or time intervals that can be required to output the said vehicle occupant information are obtained by reducing the previous content and/or releasing the corresponding resources. In particular, the resources can be divided between vehicle occupant information to be output and one or more previous active contents on the mobile user device, e.g. in accordance with one or more predetermined criteria. The resources of the mobile user device can also be varied with respect to the computing power, storage or wireless data transmission in an analogous fashion, e.g. for the benefit of the outputting of the vehicle occupant information.

According to one advantageous refinement, it is detected that the vehicle occupant is listening to audible content with the mobile user device and/or is making a telephone call, and auditory information is output with means of the mobile user device representing the information relating to the specific detected traffic situation and/or relating to a requested or recommended action by the vehicle occupant in connection with the detected traffic situation. Particularly preferably outputting of an acoustic or haptic request occurs to direct one's attention to the traffic situation in the surroundings of the vehicle and/or to the image sequence on the mobile user device.

According to one advantageous refinement, the method comprises detecting the present application of the mobile user device and/or of a perception channel of the driver which is significantly taken up by the use of the mobile user device, and subsequent actuation of the output unit of the mobile user device in accordance with the detected application case of the mobile user device and/or the determined perception channel.

If, for example, the mobile user device is held in the hand and a telephone call is made with it, a first actuation operation may be performed, for example, vibration and/or outputting of sound, in particular comprising an announcement.

If, for example, the mobile user device is being operated on the screen, e.g. if a game is being played or a map is being viewed, a second actuation operation, for example changing and/or production of a display on the mobile user device can take place.

The application case of the mobile user device can be classified into two or more different classes. These classes can differ here according to the perception channels of the vehicle occupant which are particularly taken up here. These classes can also differ according to the required means of perception and/or attention which is taken up or not taken up, required gaze, listening, haptic content or haptic operator control. In this context, the actuation of the at least one output unit of the mobile user device can be varied in accordance with the detected application case or the detected class of the application case.

According to one advantageous refinement, the method comprises detecting at least one specific perception channel of the vehicle occupant, in particular of the driver or of the vehicle occupant in the driver's seat which is taken up by the mobile user device, and in particular the intensity with which at least one perception channel is taken up, and subsequently actuation of the output unit of the mobile user device in accordance with the detected perception channel, and in particular in accordance with the detected intensity.

For example, the taking up (current use, attention, sensory overload) on one or two perception channels of the vehicle occupant in connection with the use of the mobile user device can be detected. Depending on the detected information, one or two actuation operations of the at least one output unit of the mobile user device which relates to the at least two respective perception channels of the vehicle occupant can.

It is preferably possible to detect in accordance with the input and/or output of the mobile user device in particular also with evaluated contents, which of the perception channels of the vehicle occupant is currently perceiving the contents of the mobile user device.

It can also be determined how intensively this perception channel is used or overloaded, and a decision can then be made about the actuation of one or more actuators of the mobile user device. For example, vibration and/or outputting of sound, in particular comprising an announcement, can occur, or changing and/or production of a display on the mobile user device.

In addition, the possibility can be provided in the invention of influencing, in particular controlling, at least one suitable function of the vehicle, in particular a function which relates to the method by means of the mobile user device.

In summary, the method described above provides the following advantages:

The method contributes to increasing the traffic safety for the keeper of a vehicle, in particular a vehicle which drives in an at least partially automated fashion, for its occupants and for other road users.

Mobile user devices, such as smartphones are very important for many people. By means of the method, these devices can be used in the driving mode of a vehicle which drives in an at least partially automated fashion, without endangering road safety. Conversely, it is also possible with the invention to use the vehicle and/or specific vehicle functions in the driving mode while a mobile user device is performing a function (possibly also an urgent or important function).

Furthermore, steps of the method can be carried out by means of the mobile user device, so that resources of the mobile user device (data, sensor system, computing power) can be used and the possibly overloaded resources of the vehicle can be relieved of loading.

The method also contributes to a sensation of safety of other vehicle occupants (not seated in the driver's seat), since they are also informed, if appropriate.

According to a further aspect, the invention is distinguished by a mobile user device, in particular a device, comprising at least one user device, configured to produce visual information relating to at least partially automated driving with means of a mobile user device. In this context, the mobile user device can be configured to carry out at least part of the method according to the first aspect. For example, the mobile user device can bring about the actuation of an output unit of the mobile user device in accordance with transferred information. In addition, the mobile user device can also be considered to be part of the described system.

The mobile user device can for this purpose have a wirebound or wireless interface which is configured to carry out the method. Alternatively or additionally, a transmitter part and/or a sensor system and/or computing resources and/or a transceiver unit and/or authentication methods of the mobile user device can advantageously be used or also used in the method.

A data link (which is configured to carry out the method) can be set up to the vehicle automatically here, e.g. if it is detected that the driver is using his mobile user device while traveling, in particular under further specified conditions with respect to the driving context etc). For example, such a link can also function as evidence of the legality of the use of the mobile user device when driving and/or as a technically implemented precondition for automation of the travel.

The information which is transferred or exchanged between the vehicle or the vehicle unit and the at least one mobile user device can be here:

information which is determined with means of the vehicle and transferred to the mobile user device, in particular information which is transferred using the so-called push method, and/or information which is read out, e.g. explicitly retrieved, from the vehicle by the mobile user device, e.g. smartphone, in particular in response to predetermined criteria being satisfied.

In the method it is also possible to differentiate between different types of mobile user devices, wherein e.g. different actuation operations of the output units are provided for the different types of mobile user devices.

The mobile user device can be, within the scope of this description, a smartphone, tablet, smartwatch, smart closet, in particular an item of clothing with an electronic device which is integrated into the item of clothing, motorcycle helmet, e.g. motorcycle helmet with an integrated man-machine interface, a set of data glasses for the driver of the vehicle, a vehicle computer which can be carried along with the vehicle and can be connected to the vehicle with the data interface, an external navigation device or an appropriate development of such devices.

For example, one or more functions of the mobile user device can be controlled in accordance with the implementation of a further feature of the method. For example if it is detected that the user device is being carried along in a motor vehicle which is driving in an at least partially automated fashion and/or is being actively operated in the driver's seat, specific functions of the mobile user device are operated in accordance with the readiness to carry out the method. For example, specific functions, in particular specific applications, apps etc. can only be operated in the driving mode of the vehicle, or to an expanded extent in the driving mode of the vehicle, if a data link for carrying out the method is set up or if readiness to transfer said information or to carry out the actuation of the output unit of the mobile user device is ensured.

The method is preferably carried out in accordance with a variable representing the degree of automation of the driving of the vehicle. For example, the method is carried out only or predominantly above a first limiting value and/or below a second or specified variable.

The variable representing the degree of automation of the driving of the vehicle represent different aspects of the degree of automation, for example in the form of code values. The degree of automation or the extent of automation can characterize qualitative and/or quantitative measures of the degree of automation here.

These are each expediently taken into account. In particular, these are aspects which can be actuated or operated at least partially independently of one another. In this context, it is also possible to apply degrees of automation for at least two different aspects of the automation of the movement of the vehicle and/or for two or more different driver assistance functions of the vehicle, e.g.:

longitudinal guidance of the vehicle, and/or
lateral guidance of the vehicle, and/or
execution of a lane change, and/or
execution of an overtaking maneuver, and/or
driver information, in particular relating to the control of the vehicle.

For example, the degree of automation or the variable representing the degree of automation of the driving of the vehicle can be taken into account at least partially with respect to a section of roadway lying ahead, e.g. of 10, 20, 50, 100, 150 meters.

The production of said visual information is preferably no longer carried out, explicitly canceled or carried out to a significantly reduced extent if it is determined that the determined traffic situation permits (again) some, in particular, other use of the mobile user device, for example for the purpose of communication or entertainment and/or there is no (or no urgent) required action with respect to the operator control of the vehicle, in particular no driver's task (any longer) for said vehicle occupant.

In particular, in the method it is possible to transfer information to the mobile user device which is (explicitly) characteristic of the fact that a criticality level, urgency level, hazard potential, of the determined, in particular predicted, traffic situation has reduced or will reduce e.g. in comparison with a predetermined measure or in comparison with an expectation. In other words, in the method it is also possible to transfer (explicit) information (for example an "all-clear signal" or a change in the predicted reality) to the mobile user device. Immediate or indirect actuation of the output unit of the mobile user device can then be canceled or can take place in such a way that at least one reduction occurs in the changes which have previously been brought about.

For example, at least one previously output content can then be restored or output (further) for example with a previous parameter. A further content which is planned for output (or is in a so-called queue or is interrupted) of the mobile user device can also be output with the display device of the mobile user device.

Operation of the mobile user device is preferably addressed with the invention in the passenger compartment of the vehicle during the driving mode of the vehicle (this also includes a parking operation and maneuvering operation of the vehicle). This results in numerous explicitly described advantages, as well as further advantages which can be easily understood by a person skilled in the art. For example, in this context the mobile user device can also, if appropriate, be used by the driver or the vehicle occupant in the driver's seat of the vehicle (for various purposes) in the driving mode of the vehicle.

Alternatively or additionally, the method can also be operated in such a way that the mobile user device is located at least temporarily outside the vehicle, in particular in the vicinity of the vehicle. For example, the mobile user device can be operated while said vehicle is carrying out an at least partially automated parking operation or maneuvering operation. I.e. the occupant of the vehicle can be located e.g. temporarily outside the vehicle.

According to a further aspect, the invention is distinguished by a computer program, in particular a computer program product comprising a computer program, wherein the computer program is designed to carry out the method according to one of claims 1 to 12 when it is run on a computer unit of the vehicle and/or of the mobile user device.

According to a further aspect, the invention is distinguished by a vehicle unit or a vehicle comprising said vehicle unit. For example, the vehicle unit can be a control unit of the vehicle, a computing unit which is installed in the vehicle and/or connected to the vehicle, wherein the vehicle unit is configured to carry out at least the method together with a mobile user device which can be carried along in the vehicle.

The invention can also be applied in a vehicle which drives (or can drive) at least partially or mostly manually.

For example, the method can also be carried out while the vehicle is driving in a way which is or can be supported by a driver assistance system.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
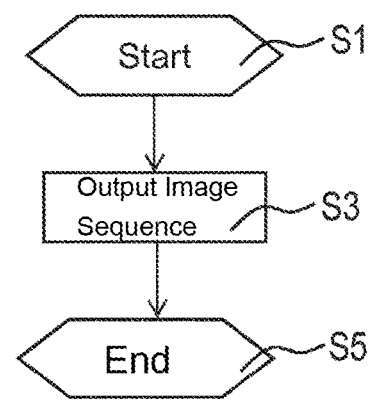
FIG. 1 is a flow diagram of the production of visual driver information in connection with at least partially automated driving by way of a mobile user device.

FIG. 1 shows a flow diagram of the production of visual driver information in connection with at least partially automated driving with means of a mobile user device.

The program can be executed by a device or by a plurality of devices, in particular within the scope of a so-called distributed electronic system. The device comprises for this, in particular, at least one computing unit, one program memory and data memory and, for example, one or more communication interfaces.

The program is started in a step S1 in which, if appropriate, variables can be initialized.

In a step S3, visual information is output on a display device of the mobile user device, in particular an image sequence, representing a traffic situation which is detected with means of the vehicle and/or a required action by a vehicle occupant, which is requested or recommended in this context.

In a step S5, the program is ended and, if appropriate, can be started again in the step S1.

The method can optionally comprise one or more of the following steps:

a step in which it is detected that the mobile user device is being carried along in the vehicle or the passenger compartment of the vehicle, a step in which it is detected that the mobile user device is being used, in particular operated (while the vehicle is traveling). In this context, the type of operator control and the frequency of operator control can be evaluated and taken into account.

a step in which a variable of the driving of the vehicle, which variable is current or predicted for the near future and represents the degree of automation, is determined. Then, visual information is produced for an occupant of the vehicle in accordance with a decrease in a variable which is current or predicted for the near future or for a section of road lying ahead and which represents the degree of automation. In this example, said visual information appears or becomes larger if the variable representing the degree of automation of the vehicle drops considerably and/or undershoots a certain threshold value. In this example, said visual information becomes smaller, changes or disappears if the variable representing the degree of automation of the vehicle increases considerably and/or exceeds a certain threshold value, a step in which the visual information, in particular an image sequence representing the traffic situation and/or a required action by a vehicle occupant which relates to the traffic situation represents a reality predicted into the near future.

a step in which an active display content of the mobile user device is reduced or prepared and/or a further display is displayed which at least partially represents the respective traffic situation and/or the required action by the occupant of the vehicle which is connected to the traffic situation.

a step comprising:
registering a traffic situation and/or determining a specific required action by at least one occupant of a vehicle in the driving mode, transferring information which is dependent on the registered traffic situation and/or the at least one specific required action by the occupant of the vehicle, to the mobile user device of at least one occupant of the vehicle, and subsequently, actuating the mobile user device in accordance with the transferred information, wherein visual information, in particular an image sequence, which represents the traffic situation and/or the required action at least symbolically is output, a step in which the outputting on the display device is representative of:
a request for the driver to direct their attention to the surroundings of the vehicle, a request for the driver to direct their attention to information about the vehicle, in particular to a display of the vehicle, in particular relating to control of the vehicle, a request to grip the steering wheel, in particular as a so-called "hands-on request", a request for the driver, to briefly depress or operate a pedal of the vehicle or to confirm readiness to operate at least one pedal, a request to change the vehicle speed, a request to maintain an, in particular lateral, distance, a request for the driver to participate in a specific maneuver, a request for the driver to make a decision with respect to a specific maneuver, a request for at least part of the control of the vehicle to be assumed by the driver a request to a front seat passenger to wake up or to stir the vehicle occupant in the driver's seat.

a step in which the outputting on the display device takes place in accordance with one or more predetermined criteria relating to the determined traffic situation and/or the determination of a specific required action by at least one occupant of a vehicle which is driving in an at least partially automated fashion, a step in which a mobile user device in the passenger compartment of the vehicle is detected as that of the vehicle occupant in the driver's seat, and the outputting takes place on the display device of the detected mobile user device of the vehicle occupant in the driver's seat, a step in which at least one mobile user device is detected as a mobile user device of a further, in particular of a specific, vehicle occupant or of a vehicle occupant in another seat of the vehicle, and the outputting takes place on the display device of the detected mobile user device of the vehicle occupant in the other seat of the vehicle, a step in which different threshold values relating to the significance of the traffic situation and/or significance and urgency of the required action by the at least one vehicle occupant are differentiated, and different actuation processes of one or more output units of the mobile user device are subsequently carried out, a step in which it is detected that the vehicle occupant is listening to audible content and/or is making a telephone call with the mobile user device, and auditory information is output with means of the mobile user device representing the information relating to the specific detected traffic situation and/or relating to a requested or recommended action by the vehicle occupant in connection with the detected traffic situation; also preferably comprising:

outputting of an acoustic or haptic request to direct one's attention to the traffic situation in the surroundings of the vehicle and/or to the image sequence on the mobile user device, a step comprising:

detecting a present application case of the mobile user device and/or of at least one perception channel of the driver or of the vehicle occupant on the driver's seat which is taken up by the use of the mobile user device, and subsequently actuation of the output unit of the mobile user device in accordance with the detected application case of the mobile user device and/or the determined perception channel of the driver or of the vehicle occupant on the driver's seat which is taken up, a step comprising:

detecting at least one specific perception channel of the driver which is taken up by the mobile user device and, in particular, detection of the intensity with which the at least one perception channel is taken up, and subsequently, actuating the output unit of the mobile user device in accordance with the detected perception channel and, in particular, in accordance with the detected intensity.

Figure 2:
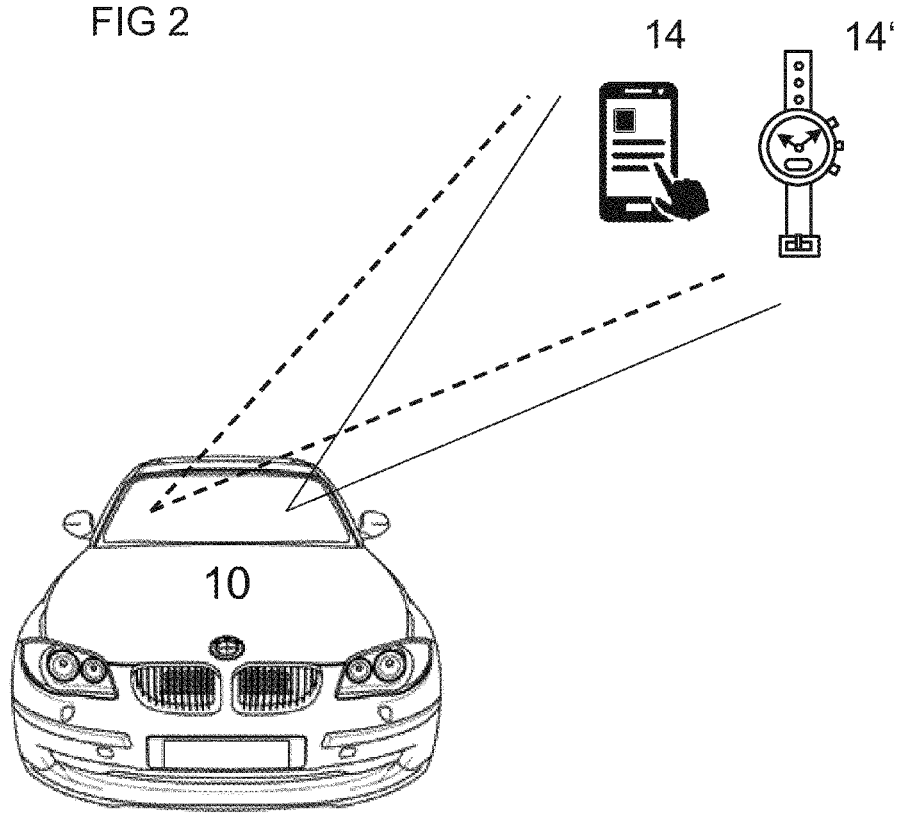
FIGS. 2 and 3 show a system for producing visual driver information in connection with at least partially automated driving with a mobile user device.

FIG. 2 illustrates that the mobile user devices 14 and 14' are located in the passenger compartment of the vehicle. In addition, FIG. 2 illustrates that these mobile user devices 14 and 14' are located and/or used, in particular operated, in such spatial areas which are associated with different seats.

Optionally, the mobile user devices 14, 14' can be operated as being located in the spatial areas which are associated with different seats.

In this context, these user devices 14, 14' are assigned to different seats (and as a result each to one or more vehicle occupants, e.g. driver, co-driver, specific vehicle occupant).

Figure 3:
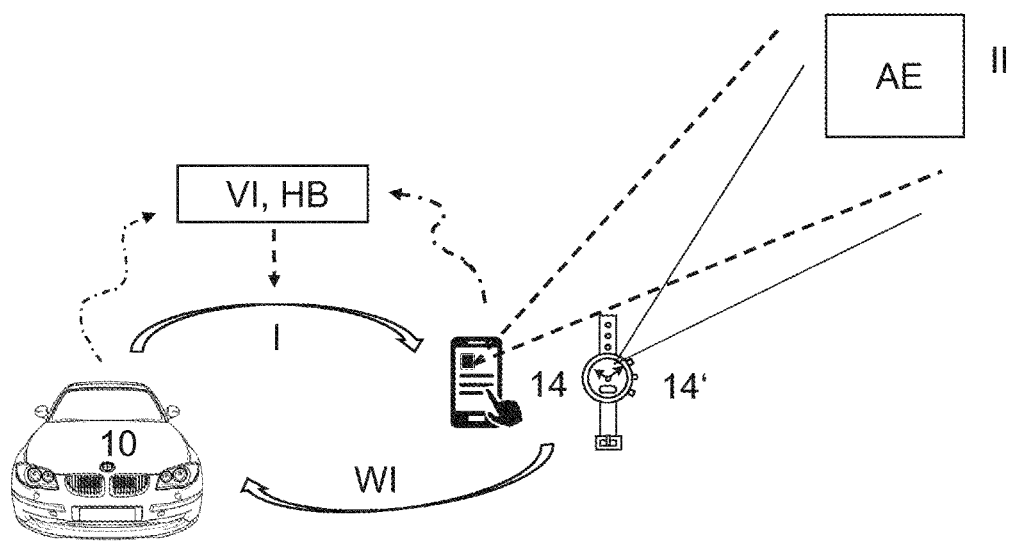

FIG. 3 also illustrates further features of the invention.

The vehicle 10 is a vehicle which is configured for at least partially automated or assisted driving (assisted by at least one driver assistance system). The method can be carried out, in particular, in an at least partially automated mode of the vehicle. For example, the method is carried out in accordance with a signal coupling process (referred to as "pairing") between a vehicle unit, e.g. a unit which is installed in the vehicle 10, and the mobile user device 14, 14'.

The at least one mobile user device 14, 14' is preferably located in the passenger compartment of the vehicle or is carried along in the vehicle in the driving mode of the vehicle, in particular during at least partially automated driving, parking or maneuvering. The mobile user device 14 is illustrated in a simplified form as a smartphone in this example. The mobile user device 14' can be a smartwatch which is worn on the body of the at least one vehicle occupant or intelligent item of clothing ("smart-clothes"). The invention is carried out, in particular, in the driving mode of the vehicle.

The traffic situation VI and/or a specific required action HB of at least one vehicle occupant of a vehicle 10 which is driving at least partially assisted by a driver assistance system or in automated fashion is registered or determined, in particular with means of the vehicle 10 and/or of the mobile user device 14, 14'.

Information I which is dependent on the registered traffic situation VI and/or the at least one specific required action HB for the vehicle occupant of the vehicle 10 is transferred to the mobile user device 14, 14' of the vehicle occupant of the vehicle 10.

Subsequently, an output unit of the mobile user device 14, 14' is actuated in accordance with the transferred information I. In this context, content which has possibly been output until now is changed. Depending on the transferred information I and/or depending on the content which has been output until now, the content is then changed, in this example reduced, output further in a simplified form, paused, minimized or switched off. Vehicle occupant information II is output along with this.

The further information WI which is described in the general part is optionally transferred from the mobile user device 14, 14' to the vehicle 10 or the vehicle unit in the vehicle 10.

The vehicle occupant information II is output with an output unit AE of the mobile user device 14, 14'.

In addition, the invention comprises the fact that a functionality or a plurality of functionalities described in this document is/are not implemented, or is/are not implemented in a significantly changed form, if it is detected that the mobile user device 14, 14' is located outside the passenger compartment of the vehicle 10 or e.g. is no longer located in the passenger compartment of the vehicle 10, e.g. if a data link which is being operated in the passenger compartment is interrupted, or the mobile user device is or has been removed from the passenger compartment of the vehicle 10.

The steps can be carried out by a device of the vehicle 10 and/or by a mobile user device 14, 14'.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for producing visual information, by way of a mobile user device, for an occupant of the vehicle in a context of at least partially automated driving, the method comprising:

outputting visual information on a display device of the mobile user device, wherein the visual information represents a traffic situation detected by way of the vehicle and/or represents a required action by a vehicle occupant, which is requested or recommended in said context;

the mobile user device in a passenger compartment of the vehicle is detected as that of the vehicle occupant in a driver's seat; and the outputting takes place on the display device of the detected mobile user device of the vehicle occupant in the driver's seat; and receiving information from the mobile user device characterizing that the vehicle occupant has, interrupted operation of the mobile user device, and/or stopped paying attention to the mobile user device using a sensor of the mobile device, and changing a control action of the vehicle based or the received information.

2. The method according to claim 1, wherein the visual information output is an image sequence.

3. The method according to claim 1, wherein the visual information representing the traffic situation and/or the required action by the vehicle occupant, relating to the traffic situation, represents a reality which is predicted in a near future.

4. The method according to claim 1, wherein an active display content of the mobile user device is reduced or prepared, and/or occupant information which is different from the active display content and which at least partially represents the respective traffic situation and/or the required action by the occupant of the vehicle, which is connected to the traffic situation, is output.

5. The method according to claim 1, further comprising: registering a traffic situation and/or determining a specific required action by at least one occupant of a vehicle in a driving mode,
transferring information which is dependent on the registered traffic situation and/or the at least one specific required action by the occupant of the vehicle, to the mobile user device of at least one occupant of the vehicle, and,
subsequently actuating the mobile user device in accordance with the transferred information, wherein visual information which represents the traffic situation and/or the required action at least symbolically is output.

6. The method according to claim 1, wherein the output on the display device is representative of:
a request for the vehicle occupant to direct their attention to the surroundings of the vehicle,
a request for the vehicle occupant to direct their attention to information about the vehicle,
a request to grip the steering wheel,
a request for the vehicle occupant to briefly depress or operate a pedal of the vehicle or to confirm readiness to operate at least one pedal,
a request to change a vehicle speed,
a request to maintain a distance,
a request for the vehicle occupant to participate in a specific maneuver,
a request for the vehicle occupant to make a decision with respect to a specific maneuver,
a request for at least part of the control of the vehicle to be assumed by the vehicle occupant,
a request to a front seat passenger to wake up or to stir the vehicle occupant or to communicate specific information to said vehicle occupant.

7. The method according to claim 6, wherein the vehicle occupant is the vehicle occupant on a driver's seat.

8. The method according to claim 1, wherein the output on the display device takes place in accordance with one or more predetermined criteria relating to the determined traffic situation and/or the determination of a specific required action by at least one occupant of a vehicle which is driving in an at least partially automated fashion.

9. The method according to claim 1, wherein at least one mobile user device is detected as a mobile user device of a further vehicle occupant or of a vehicle occupant in another seat of the vehicle, and the outputting takes place on the display device of the detected mobile user device of the vehicle occupant in the other seat of the vehicle.

10. The method according to claim 1, wherein different threshold values relating to the significance of the traffic situation and/or significance and urgency of the required action by the at least one vehicle occupant are differentiated, and
different actuation processes of one or more output units of the mobile user device are subsequently carried out.

11. The method according to claim 1, further comprising: detecting that the vehicle occupant is listening to audible content and/or is making a telephone call with the mobile user device, and
outputting auditory information by way of the mobile user device representing the information relating to the specific detected traffic situation and/or relating to a requested or recommended action by the vehicle occupant in connection with the detected traffic situation.

12. The method according to claim 11, further comprising:
outputting of an acoustic or haptic request to direct one's attention to the traffic situation in the surroundings of the vehicle and/or to the image sequence on the mobile user device.

13. The method according to claim 1, further comprising: detecting a present application case of the mobile user device and/or of at least one perception channel of a driver or of the vehicle occupant on a driver's seat which is taken up by the use of the mobile user device, and subsequently
actuating the output unit of the mobile user device in accordance with the detected application case of the mobile user device and/or the determined perception channel of the driver or of the vehicle occupant on the driver's seat which is taken up.

14. The method according to claim 1, further comprising: detecting at least one specific perception channel of the driver which is taken up by the mobile user device including detection of an intensity with which the at least one perception channel is taken up, and subsequently,
actuating the output unit of the mobile user device in accordance with the detected perception channel including the detected intensity.

15. The method according to claim 1, further comprising: in response to the received information, transmitting a request to the mobile user device of a further vehicle occupant to carry out an operator control action in the vehicle.

16. The method according to claim 15, wherein the operator control action influences at least one of a lateral guidance, longitudinal guidance, or execution of a maneuver of the vehicle.

17. The method according to claim 1, wherein the sensor of the mobile user device is a camera.

18. A computer program product comprising a non-transitory computer readable medium having stored thereon program code that, when executed, carries out the acts of:
determining, using a mobile user device, that a vehicle occupant of a vehicle is actively using a mobile user device;
determining that a driving action is planned or started by the vehicle in at least a partially automated fashion; and
outputting visual information on a display device of the mobile user device, wherein based on the determining that the vehicle is actively using the mobile user device and the determining that a driving action is planned or started, the visual information instructs the vehicle occupant to refrain from carrying out a specific control action during the driving action and characterizes the reason and/or consequence of the specific control action.

19. A mobile user device of an occupant of a vehicle operating in at least partially automated driving mode, wherein the mobile user device is configured such that visual information in a form of an image sequence is output on a display of the mobile user device, wherein the image sequence represents at least one of:
 a traffic situation detected by way of the vehicle, and
 a required action by the vehicle occupant which is requested or recommended for the traffic situation, wherein
  the mobile user device in a passenger compartment of the vehicle is detected as that of the vehicle occupant in a driver's seat, and
  the outputting takes place on the display device of the detected mobile user device of the vehicle occupant in the driver's seat; and the mobile device is farther configured to:
 transmit information characterizing that the vehicle occupant has:
  interrupted operation of the mobile user device, and/or
  stopped paying attention to the mobile user device using a sensor of the mobile device.

* * * * *